United States Patent [19]

Kern

[11] 4,232,315
[45] Nov. 4, 1980

[54] RANGE DETECTOR

[75] Inventor: Neil C. Kern, Mesa, Ariz.

[73] Assignee: Motorola, Inc., Schaumburg, Ill.

[21] Appl. No.: 594,316

[22] Filed: Nov. 8, 1966

[51] Int. Cl.³ .................... G01S 13/64; G01S 13/70; G01S 13/18
[52] U.S. Cl. .................... 343/7.3; 343/9 R; 343/13 R
[58] Field of Search .................. 343/13, 17.2, 9, 17.5, 343/7.3, 13 R, 9 R, 17.2 R

*Primary Examiner*—Malcolm F. Hubler
*Attorney, Agent, or Firm*—Eugene A. Parsons; Maurice J. Jones

[57] ABSTRACT

A doppler range detector with early and late range gates responding to radar returns or either side of maximum velocity range and supplying a peak output amplitude when the early and late gates have the same doppler frequency. A peak detector is used to detect slant range with a dual pulse ranging system. The returns are supplied to two zero beat mixers, the output signals of which are passed through separate bandpass filters to a multiplier. The multiplier output is supplied through a low pass filter to the peak detector.

6 Claims, 2 Drawing Figures

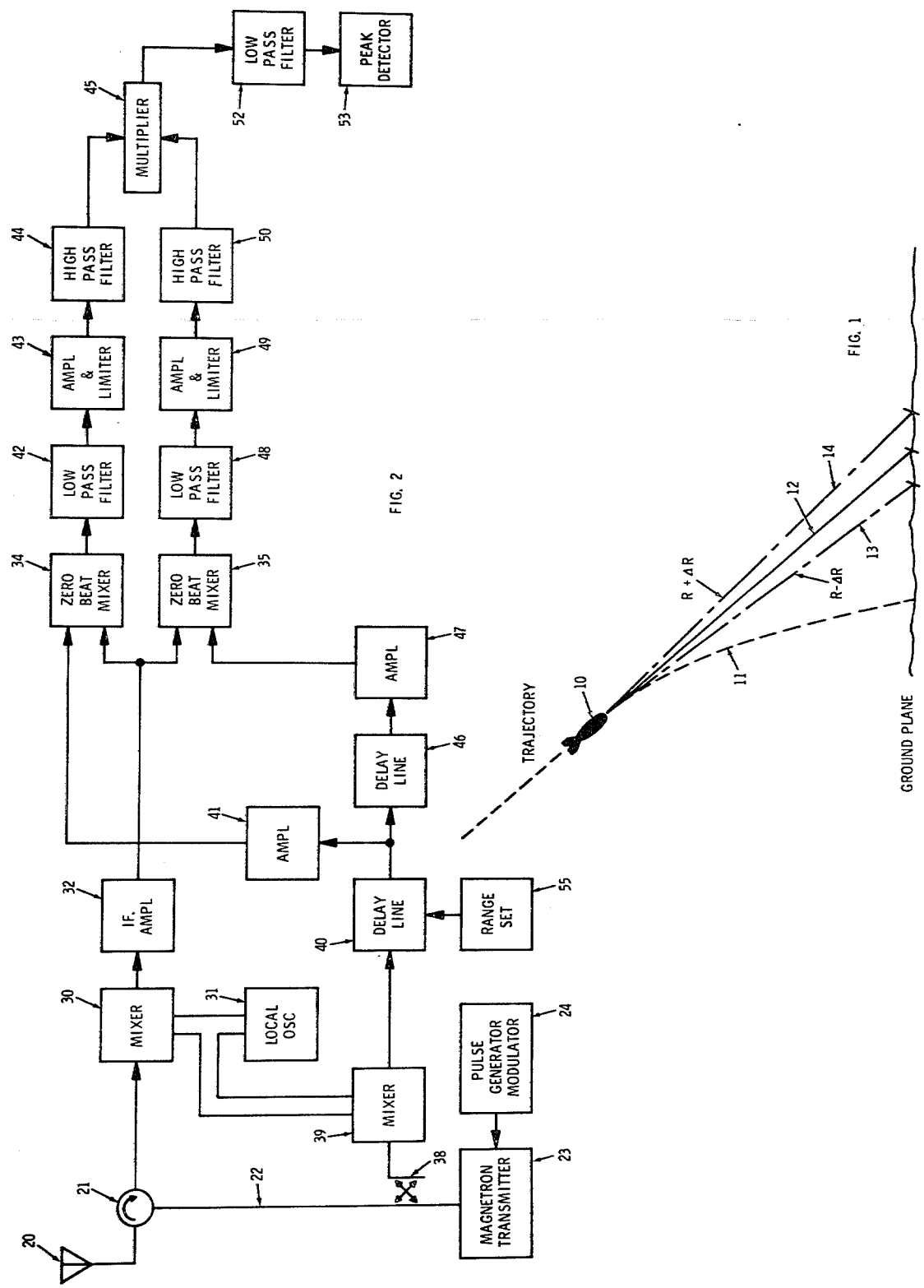

RANGE DETECTOR

This invention relates generally to a Doppler radio ranging system, and more particularly to a ranging system to be used on a moving vehicle to provide an indication when the vehicle has a predetermined range with respect to a fixed object.

Various radio ranging devices have been used to determine the distance of a vehicle from a particular object. For example, it may be desired to provide an indication when a missile, projectile or other airborne vehicle has a given slant range with respect to a particular object or earth. Various systems have the disadvantage that undesired returns are present which interfere with the desired return. Some systems require complex antennas to separate the desired returns, and are otherwise complicated and expensive.

It is, therefore, an object of the present invention to provide an improved slant ranging system which provides accurate range indication.

Another object of the invention is to provide a slant ranging system which is relatively simple, and is dependable in operation.

A feature of the invention is the provision of a Doppler range detection system having early and late range gates which respond to returns on either side of the maximum velocity range, and which produces a maximum output when the signals passed by the early and late range gates have the same Doppler frequency.

A further feature of the invention is the provision of a dual pulse slant ranging system wherein the return pulses intermediate frequency signals are applied to two zero beat mixers, to which intermediate frequency pulses from the transmitter are applied with different delays, with the outputs of the mixers being applied through separate bandpass filters and limiters to a multiplier, the output of which is passed through a low pass filter to a peak detector. The output of the low pass filter is maximum when the Doppler components derived from the mixers are of the same frequency, and the peak detector can therefore indicate when the set range is reached and provide a control, as desired.

The invention is illustrated in the drawing wherein:

FIG. 1 is a diagram illustrating the operation of the system of the invention; and FIG. 2 is a block diagram of the system of the invention.

The system of the invention includes an antenna for transmitting radar pulses produced by a transmitter, which may include a magnetron and a pulse modulator, and for receiving the pulses when reflected. The received pulses are converted to intermediate frequency and applied to a pair of zero beat mixers. Samples of the transmitted pulses are also converted to intermediate frequency and applied through a first delay line and amplifier to one zero beat mixer, and through an additional delay line and further amplifier to the second zero beat mixer. Reference signals are therefore applied to the two mixers having two different delays, corresponding to the pulses returned over two different ranges. The outputs of the zero best mixers over a predetermined frequency range, representing the Doppler components of the reflected pulses, are derived and limited, and are multiplied with each other. The low frequency components of the multiplied signal are derived and applied to a peak detector. Since the low frequency components are maximum when the signals applied to the multiplier have the same frequency, the output will be maximum when the two Doppler frequencies are the same. This indicates that the two derived ranges are symmetrically positioned on opposite sides of the maximum velocity vector, since this is the only condition in which signals in the plane of the trajectory returned over two different ranges can have the same Doppler frequency. The first delay line which delays both reference signals can be adjusted to change the range at which the maximum output is obtained.

Referring now to the drawings, in FIG. 1., there is shown a missile or projectile 10 moving toward earth on a trajectory shown by the dotted line 11. The maximum velocity vector of the missle with respect to earth is tangent to the path and is represented at the point shown by the solid line 12. A signal from the missile which is transmitted and reflected by earth along the maximum velocity will have a maximum Doppler frequency. Signals from the missile reflected from earth on either side of the maximum velocity vector, as shown by the dot-dashed lines 13 and 14, will be of lower frequency than that along line 12. As the vectors move further from the line of the maximum velocity vector, the Doppler frequency of the return signals will be progressively reduced. The Doppler frequency of two returns which are positioned on opposite sides of the maximum velocity vector by the same amount will have the same frequency. However, the return along line 14 will be delayed with respect to the return along line 13 since the distance is greater, and the time required for the wave to reach earth and be reflected thereby will be greater. These characteristics are utilized in the system of the invention to provide detection of the slant range from the missile to earth.

The system of the invention is illustrated in FIG. 2, and the antenna 20 is a directional antenna rigidly mounted to the missile or projectile with its beam center along the center line of the missile. Pulses of X band radar frequency (8500–9600 megacycles) are applied to the antenna 20 through the Y circulator 21 and the waveguide 22, from the magnetron transmitter 23. The magnetron transmitter is modulated by pulse generator and modulator 24, the magnetron and pulse generator and modulator being of any known configuration. The radar pulses are transmitted from antenna 20, which may be mounted on a missile 10 as shown in FIG. 1, with the signals being directed along the lines 12, 13 and 14. Pulses returned from earth are received by the antenna 20 and pass through the Y circulator 21 to a mixer 30. Local oscillations are applied to the mixer from oscillator 31, and the intermediate frequency is selected and amplified by amplifier 32. The output of the intermediate frequency amplifier is applied to the two zero beat mixers 34 and 35.

Samples of the transmitted pulses are derived from the waveguide 22 by directional coupler 38 and applied to mixer 39. Signals from local oscillator 31 are also applied to this mixer so that intermediate frequency signals are produced having the same frequency as the intermediate frequency signals from mixer 30, except for the Doppler frequencies of the returned wave. The intermediate frequency signals from mixer 39 are applied through delay line 40 and amplifier 41 to the zero beat mixer 34. The output signals from the mixer 34 are passed through low pass filter 42, amplifier and limiter 43 and high pass filter 44, to multiplier 45. The signals from delay line 40 are further delayed by delay line 46 and applied through amplifier 47 to the second zero beat mixer 35. The output from the mixer 35 is applied through low pass filter 48, amplifier and limiter 49 and high pass filter 50 to the multiplier 45.

The signals from the two high pass filters 44 and 50 are multiplied in mixer 45 and the output thereof is selected by low pass filter 52. The output of the filter 52 is applied to a peak detector 53. The low frequency output of the multiplier is a maximum when the two frequencies applied to the multiplier are the same, and this low frequency output is selected by the filter 52. The peak detector will, therefore, indicate when the range is such that the two returns are equally spaced from the desired slant range.

The two channels, each of which include a low pass filter, an amplifier and limiter and a high pass filter, select the Doppler frequencies of the return signals which are at two different ranges. The delay line 40 provides a delay of the transmitted pulses, and when the reflected pulses have the same delay, the output of the zero beat mixer 34 will include the Doppler components of the reflected wave. Similarly, the delay lines 40 and 46 provide a greater delay in the transmitted pulses applied to the mixer 35, and reflected pulses having this greater delay, corresponding to the greater range, will provide an output from the mixer which includes the Doppler components of the reflected pulses at this greater range. These two ranges will be on opposite sides of the maximum velocity vector at the preset detection range.

In a particular system in accordance with the invention the transmitted pulses had a length of 0.2 microsecond and the repetition rate of the pulses was 150 kilocycles. This provides a relatively high duty cycle for radar transmission. This system was for use for indicating a range of 2,000 feet for a missile having a maximum velocity of 2,000 feet per second. In this system, the low pass filters 42 and 48 had a cutoff of 40 kilocycles and the high pass filters had a cutoff of 8 kilocycles, for a Doppler frequency bandwidth of 32 kilocycles. The cutoff of the output filter 52 was 40 cycles per second.

Considering the operation of the system, when the missile is at a range such that the signals from the mixers 34 and 35, which result from pulses with different delays, have Doppler components of the same frequency, this indicates that the returns 13 and 14 (shown in FIG. 1) are symmetrically positioned on opposite sides of the maximum velocity vector. As previously stated, this is the only condition in which two returns having different delays can have the same Doppler frequency. The delay line 46 will, preferably, be set to have a delay twice the duration of the pulse width, and in the example given this is 0.4 microsecond. This controls the amount of the spacing of the two returns on either side of the maximum velocity vector. The delay line 40 can have a delay of 3.8 microsecond for a range of 2,000 feet as described in the above example. This delay can be changed to provide other ranges, and in FIG. 2, the range set 55 is provided to change the delay of line 40 to thereby change the range. As the delay line 46 provides the spacing between the two range gates, this can be maintained at the same delay for different ranges, and adjustment is not necessary.

The system as described can be used in many different applications, as in an aircraft, to give an indication when the slant range to earth is a predetermined amount. The multiplier 45 will have a maximum output when the two signals applied thereto have the same frequency, at which time the low frequency response from filter 52 is maximum. The output from peak detector 53 therefore indicates when the desired range is reached, and can be used to operate various indicators or automatic controls.

What is claimed is:

1. A range determining system including in combination, transmitter means for producing pulses of high frequency oscillations and including antenna means for radiating and receiving said pulses, means coupled to said antenna for selecting said pulses after reflection with the reflected pulses having Doppler frequency components produced by relative movement between said antenna means and the reflecting object, first mixer means for reducing the frequency of the oscillations of the received pulses, second mixer means coupled to said transmitter means for reducing the frequency of the oscillations of the transmitted pulses, first delay means connected to said second mixer means, a first zero beat mixer having inputs connected to said first mixer means and to said first delay means for deriving the Doppler frequency components from reflected pulses which have a delay corresponding to the delay of said first delay means, second delay means connected to said first delay means, a second zero beat mixer having inputs connected to said first mixer means and to said second delay means for deriving the Doppler frequency components from reflected pulses which have a delay corresponding to the sum of the delays of said first and second delay means, first and second bandpass filter means each including limiter means for providing gain control and connected to the outputs of said first and second zero beat mixers respectively for selecting the Doppler frequency components within a given band, multiplier means connected to said first and second filter means for multiplying the signals therefrom, low pass filter means connected to said multiplier means for selecting signals below a given frequency, and peak detector means connected to said low pass filter for producing an indication when the signals from said first and second bandpass filter means are of the same frequency.

2. The range determining system of claim 1 including a single local oscillator, and means applying signals from said local oscillator to said first and second mixer means.

3. The range determining system of claim 1 including a first amplifier connecting said first delay means to said first zero beat mixer and a second amplifier connecting said second delay means to said second zero beat mixer.

4. The range determining system of claim 1 wherein said first and second bandpass filter means each includes a low pass filter, an amplifier and limiter, and a high pass filter.

5. The range determining system of claim 1 wherein said first delay means is selected to produce a predetermined delay to provide an indication of a particular range associated with such delay.

6. The range determining system of claim 1 wherein said second delay means produces a delay equal to twice the length of the pulses transmitted by said transmitter means.

* * * * *